United States Patent [19]

Sabet-Peyman

[11] Patent Number: 4,801,941
[45] Date of Patent: Jan. 31, 1989

[54] ANGLE OF ARRIVAL PROCESSOR USING BULK ACOUSTIC WAVES

[75] Inventor: Farhang Sabet-Peyman, San Jose, Calif.

[73] Assignee: Litton Systems, Inc., Beverly Hills, Calif.

[21] Appl. No.: 70,839

[22] Filed: Jun. 30, 1987

[51] Int. Cl.$^4$ ............... G01S 3/16; H01L 41/04; G06G 7/12
[52] U.S. Cl. ................... 342/378; 310/335; 364/821
[58] Field of Search .............. 342/378; 310/335; 364/821

[56] References Cited

U.S. PATENT DOCUMENTS

| | | | |
|---|---|---|---|
| 3,878,520 | 4/1975 | Wright et al. | 342/384 |
| 4,329,876 | 5/1982 | Chen et al. | 73/618 |
| 4,349,794 | 9/1982 | Kagiwada et al. | 333/141 |
| 4,385,255 | 5/1983 | Yamaguchi et al. | 310/335 |
| 4,390,247 | 6/1983 | Freyre | 350/358 |
| 4,523,293 | 6/1985 | Auld et al. | 364/821 |
| 4,542,653 | 9/1985 | Liu | 367/105 |
| 4,604,543 | 8/1986 | Hachiouji | 310/334 |
| 4,608,569 | 8/1986 | Dickey, Jr. et al. | 342/384 |
| 4,609,890 | 9/1986 | Oates et al. | 333/187 |
| 4,634,230 | 1/1987 | Spezio | 342/54 |
| 4,643,028 | 2/1987 | Kunitachi et al. | 73/625 |
| 4,644,795 | 2/1987 | Brothell | 73/625 |
| 4,662,223 | 5/1987 | Riley et al. | 73/626 |

OTHER PUBLICATIONS

"Beam Scanning and Focussing of Bulk Acoustic Waves", by F. Sabet-Peyman, R. T. Weverka, I. C. Chang and P. Katzka, 1984 IEEE Ultrasonics Symposium, pp. 424–429.

"Diffraction and Detection of Bulk Acoustic Waves", by F. Sabet-Peyman and I. C. Chang, Proceedings of SPIE-The International Society For Optical Engineering, pp. 58-65, Optical Technology For Microwave Applications, Shi-Kay Yao, Editor, Apr. 9-10, 1985, Arlington, Va.

"Focused Acoustic Wave Channelizer", by Dennis R. Pope, Andrew M. Bardos, Marc H. Popek, and Manhar L. Stah, Proceedings of SPIE-Tme International Society for Optical Engineering, Dennis R. Pope, Editor, 3–4 Apr. 1986, Orlando, Fla.

Primary Examiner—Theodore M. Blum
Assistant Examiner—David Cain
Attorney, Agent, or Firm—Roy L. Brown

[57] ABSTRACT

A bulk acoustic wave angle-of-arrival processor in which a bulk acoustic body having the property of conducting bulk acoustic wave beams has formed and defined thereon at acoustically reflecting and focusing surface, the acoustically reflecting surfaces including a portion of one concave inward surface, positioned to receive acoustic beams launched from an input transducer.

The body has at least one output transducer set, and each has a plurality of juxtaposed directed finger-electrodes aligned in a row perpendicular to the long direction of the electrodes, and positioned to receive steered beams from at least one of the reflecting surfaces.

An input transducer set is positioned upon one surface of the body to steer beams into the body toward at least one of the reflecting and focusing surfaces.

The input transducer set has individual electrodes on its outer surface which are positioned and spaced to the same pattern as the respective antennas to which they are attached. Between each electrode of the input set and the bulk acoustic wave body is a piezoelectric transducer.

The transducer electrodes have spacings, that are proportional to the corresponding spacings, that are the same as the spacing of the antennas to which they are attached.

17 Claims, 4 Drawing Sheets

ANGLE OF ARRIVAL PROCESSOR USING BULK ACOUSTIC WAVES

RELATED APPLICATIONS

This application is related to a patent application entitled, "Broad Band Bulk Acoustic Wave Spectrum Analyzer/Channelizer", Ser. No. 68,156, filed the same date as this application by Farhang Sabetpeyman and I-Cheng Chang, and assigned to the same assignee.

This application is also related to copending patent application, Ser. No. 78,891, entitled, "Acoustic Transducer", filed the same date as this application by Farhang Sabetpeyman, and assigned to the same assignee.

BACKGROUND OF THE INVENTION

Electronic systems detect arriving radio frequency or radar waves. It is desired not only to determine the nature of a threat, but also to react to that threat. To do so, the angle of arrival of the radio frequency or radar signal must be determined. All of the parameters of the emitting apparatus, its position is the most difficult and slowest to change.

Systems producing information about the nature of the arriving signal and its direction of arrival are called "Electronic Support Measures" systems, and are designated herein as "ESM" systems.

In an ESM system, it is usual to use an omni-directional antenna to acquire the arriving signal. When a threat-signal is identified, a specific set of analysis-receivers is assigned to receive the signal and to evaluate the threat. Among other parameters angle of arrival of the threatsignal is desired.

ESM antennas include single beam, multibeam, scanning, monopolar, and interferometric direction fining antennas. The directional accuracy and angular resolution depends among others, upon the type of receiver used, the number and type of antennas in the array, the spacing between the antennas of the array, the field of view that must be intercepted by one antenna array, the number of arrays needed for total coverage, the ability of the receiver to preserve and track the phases of the antenna signals induced by the arriving signal, the signal-to-noise ratio at the phase-measuring point in the receiver(s), the accuracy of phase measurement in the receiver(s), and the receiver data-conversion characteristics used to derive the angle of arrival signal from the electrical phase differences among antenna signals.

BRIEF DESCRIPTION OF THE INVENTION

The apparatus of this invention uses a Bulk Acoustic Wave (herein sometimes called BAW) body having at least one concave-inward acoustical mirror interface with the atmosphere.

A first set of special input transducers, are positioned in a predetermined pattern on the outer surface of the BAW body, and each has a single input electrode, to convert incoming phased delectrical signals into acoustical signals directed toward the acoustical mirror interface within the BAW body. The input transducers are spread in a predetermined pattern on an outer surface of the BAW body. The pattern of the input transducers matches the pattern of a set of receiving antennas.

An acoustical beam is delivered by the input transducers in a particular direction through the BAW body toward the acoustical mirror. The direction of delivery of the acoustical wave to the mirror depends upon the relative phasing of the signals received from the antennas by the input transducers.

A second set of output transducers are positioned on a second region of the outside of the BAW body.

The acoustical beam is reflected from the acoustical mirror, steered and focused within the BAW body to particular output transducers of the second set, depending upon the angle of delivery of the acoustical beam to the mirror. The positions of the output transducers are unique and predetermined in a one-to-one correspondence to predetermined angles of arrival of the radio beam at the antennas. Specific transducers of the second set of output transducers each correspond to a particular range or slot of angles of arrival. Each output transducer carries an electrode that is energized when its associated transponder is energized by interception of an acoustical beam.

In one alternate embodiment of the invention, the outer surface of an input transducer has a set of plurality of electrodes thereon, and the pattern of such electrodes is the same as the pattern of the receiving antennas. The single transducer produces a directed beam as if a plurality of input transducers had been used.

Signals from the electrodes of the output transducers are delivered to a processor or calculator which is hardwired or programmed to produce a signal which is used to specify the direction of arrival of the incominng signal. The output signal may also be used for automatic radio direction finding.

Greater resolution is achieved by decreasing the range of each of the output transducers and increasing the number of such transducers in the set of output transducers.

To cause the output transducer to track the angle of arrival of a signal, the electrode pattern on a single input transducer of the input transducer pattern mirrors the antenna position pattern. For example, a plurality of dipole antennas can be spaced to receive an incoming signal. The pattern of the antennas is matched by the same pattern of electrodes on the piezoelectric member of a single input transducer or by the pattern of a number of input transducers equal in number to the number of receiving antennas. That is, the relative positions of the electrodes are the same as the relative positions of the corresponding dipole antennas. The spacing among the electrodes of the electrode pattern on the piezoelectric member is proportional, in a constant proportionality factor, to the spacing among the corresponding antennas.

The apparatus is bidirectional so that in addition to determining the angle of arrival of a received signal, the apparatus may be used to steer the propagation of a transmitter antenna array to direct the principal transmission lobe of the antenna array in a controlled direction. The direction of propagation is chosen by choosing one of the second set of transducers which is predetermined to correspond to the desired direction of transmission and energizing it as an input transducer. The resulting acoustic beam is then automatically determined from the principle of reciprocity to impinge just the required amount and phase of acoustic signal on the particular transducers of the first set to cause them to be properly energized to transmit signals to the corresponding antennas with the proper amplitudes and phase to steer the transmitted radio frequency signal.

It is therefore a feature and object of this invention to measure, using an array of antennas and a special transducer array on a BAW medium, the angle of arrival of radio frequency or radar signals.

It is a more general object of this invention, using an array of antennas and a special transducer array on a BAW medium, to measure the angle of arrival of electromagnetic emission.

It is also an object of this invention to steer the angle of transmission from an array of a set of.

Other objects will become apparent from the following description, taken together with the accompanying drawings.

Figure 1:
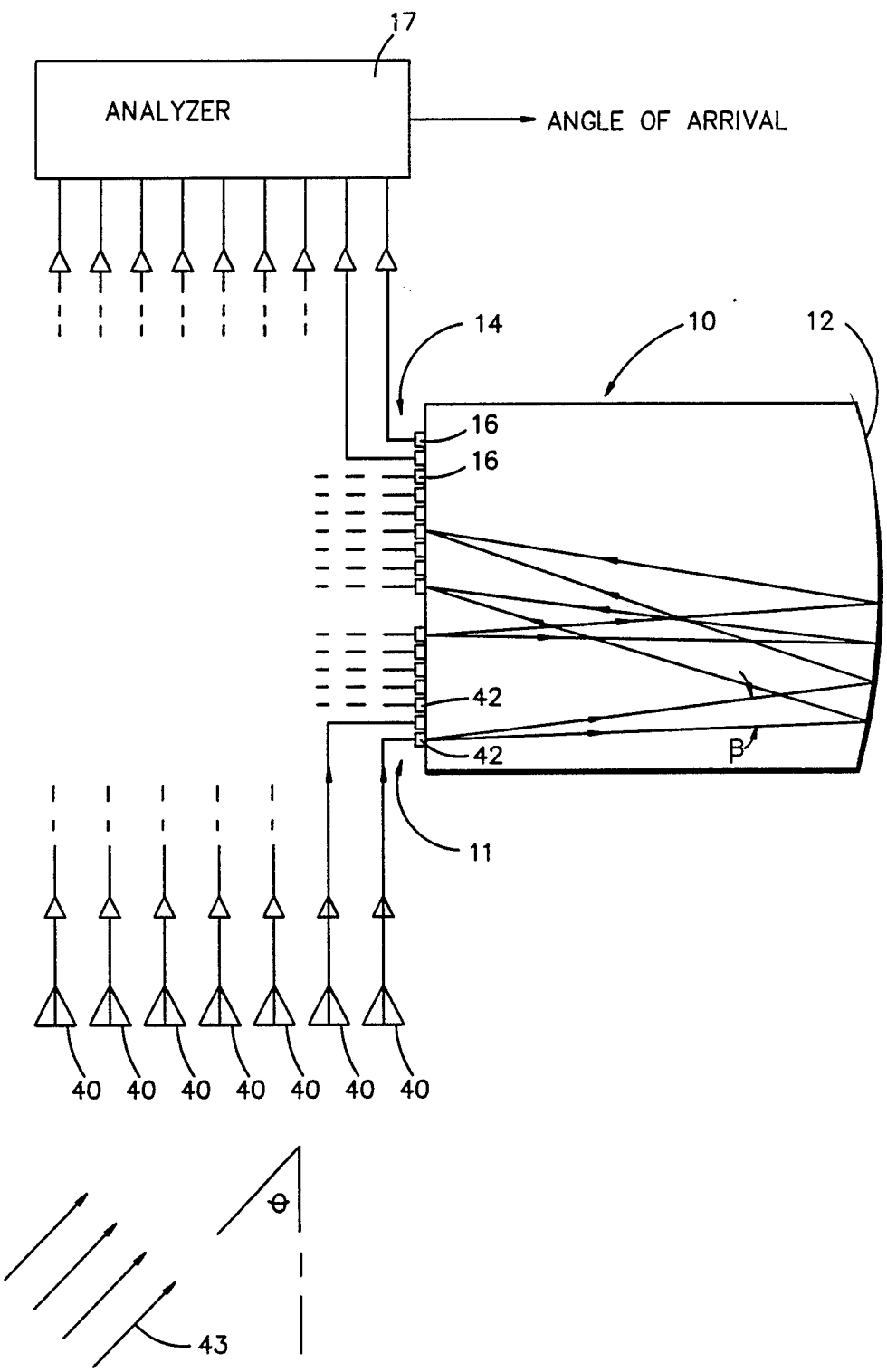
FIG. 1 is a schematic view of a bulk acoustic wave Fourier transformer, a plurality of antennas for receiving electromagnetic signals and delivering them to a first set of transducers on said transformer, a converter-computer for receiving electrical signals from the Fourier transformer and changing them into a signal that is a measure of the angle of arrival of such electromagnetic signals.
Figure 2A:
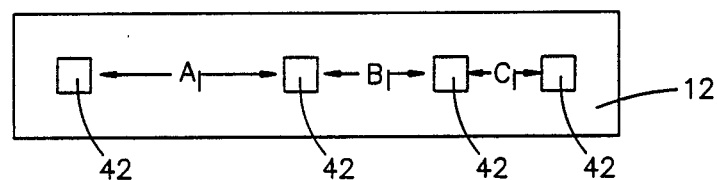
FIG. 2A is a plan diagram showing one geographic pattern of positions of a line of antennas for receiving radio frequency signals and delivering them to the electrodes of the first set of input transducer(s).
Figure 2B:
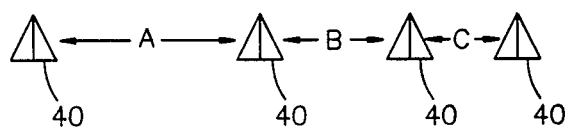
FIG. 2B is a plan diagram showing the geographic pattern of positions of the electrodes on the surface of a first set of input transducers compared to the pattern of antennas of FIG. 2A.

The apparatus of this invention uses a Bulk Acoustic Wave body 10 as a Fourier transformer. The body 10 has at least one concave-inward acoustical mirror interface 12 with the atmosphere for reflecting beams, launched into the body 10 by the input transducers 42 of the transducer set 11, onto a set 14 of output transducers.

First and second sets of transducers 11 and 14 are positioned on the BAW body 10. Each of the output transducers 16 of the set 14 is positioned with its output electrode parallel to the output electrodes of the other transducers 16. The output transducers 16 are closely spaced in a row along an alignment axis parallel to the paper of FIG. 1. Each output transducer is positioned with its long dimension perpendicular to FIG. 1.

The apparatus of this invention converts incoming phased electrical signals into acoustical signals within the BAW body 10 to determine the angle of arrival of radio frequency signals at an antenna array. It may also convert acoustical signals within the BAW body 10 into phased electrical signals for steering the propagation direction of an array of antennas.

The input transducer set 11 has a pattern of electrodes on the outer face of a transducer or a pattern of transducers 42 that matches the pattern of the antennas that deliver signals to the electrodes. Antennas 40, have a distribution pattern for intercepting a radio frequency signal. Each antenna 40 is connected to a different electrode on the surface of a transducer or transducers of the first set of transducers 11.

The signals delivered through amplifiers to the electrodes of the transducers 42 have relative phases that depend upon the pattern of the antennas 40 and the angle of arrival of the signals 43.

With a particular electrode pattern on the outer surface of an input transducer, and a particular phasing of the electrical signals delivered to such electrodes, the acoustical beam is steered and focused within the BAW body 10, thereby creating an acoustic analog of the far field of the antenna array to which the electrodes 40 are attached.

Alternatively, the electrodes may each be on individual transducers whose pattern matches the pattern of the antennas 40.

The analog acoustic field is modified by the BAW body 10 and is projected and focussed onto a specific transducer of a second set 14 of output transducers 16. The particular intercepted transducer carries an electrode 16 (see FIG. 1) that is stimulated by the beam interception.

The position of the individual transducer 16 in the transducer set 14 predeterminedly specifies that the arriving radio frequency signal is arriving from an angle within a predetermined range of angles determined by the position of the particular transducer. Note that the angles of arrival of more than one signal may be determined at the same time.

Each of the output transducers 16 of the second set has an electrode thereon, and each electrode and its corresponding particular transducer is positioned to be energized when the angle of arrival at the antennas 40 is within a predetermined range of angles of arrival. The apparatus is calibrated such that each predetermined range of angles corresponds to a particular transducer whose electrode is stimulated when the angle of approach of a signal falls within its assigned range of angles, and the signals from the transducers 16 are delivered to the analyzer 17 to stimulate the analyzer to create a signal indicative of the particular angle of arrival.

In FIG. 1, the antennas 40 are shown positioned in a line. When that is so, the corresponding electrodes 42 on the surface of the transducer also need to be spaced in a line. The spacing between the electrodes or transducers of the transducer set 11 shall be proportional, in the same proportion, as the spacing between the corresponding antennas 40.

Figure 3A:
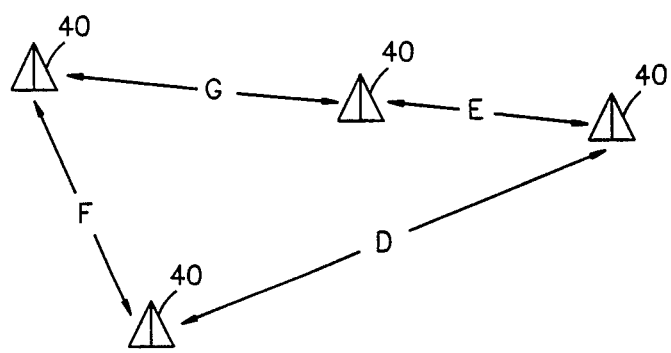
FIG. 3A is a plan diagram, similar to FIG. 2A, showing the geographic pattern of a two-dimensional array of antennas for receiving radio frequency signals and delivering such received signals to the electrodes of the first set of input transducer(s).
Figure 3B:
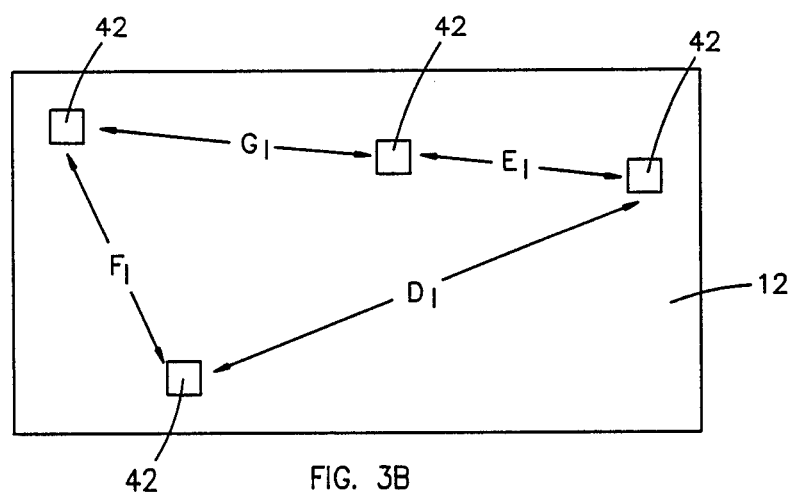
FIG. 3B is a plan diagram, similar to FIG. 2B, showing the geographic pattern of a two-dimensional array of the electrodes on the surface of an input transducer or first set of input transducers compared to the pattern of antennas in FIG. 3A.

When the antennas 40 are aligned and are spaced apart in some two dimensional pattern, of which FIG. 3a is an example, the electrodes 42 are also displayed in the same pattern on the face of the transducer. The distances $d_1$, $e_1$, $f_1$, $g_1$ and $h_1$, are proportional, by the same constant of proportionality, to the distances d, e, f, g, and h of FIG. 3b. Further, the angles between the lines connecting the electrodes 42 need to be the same as the angles between the lines connecting the corresponding antennas 40.

The beam forming operation of this invention is determined by the angle of arrival of received signals. The array of electrodes 42 is a replica of the array of antennas 40, whence the array of electrodes creates an acoustic replica of the diffraction pattern of the phased-antenna array. The receiving antenna diffraction pattern is reconstructed by the one-to-one connection (preferably through radio frequency amplifiers) between the antennas 40 and the electrodes 42 and the individual transducers of the input transducer set.

Figure 6:
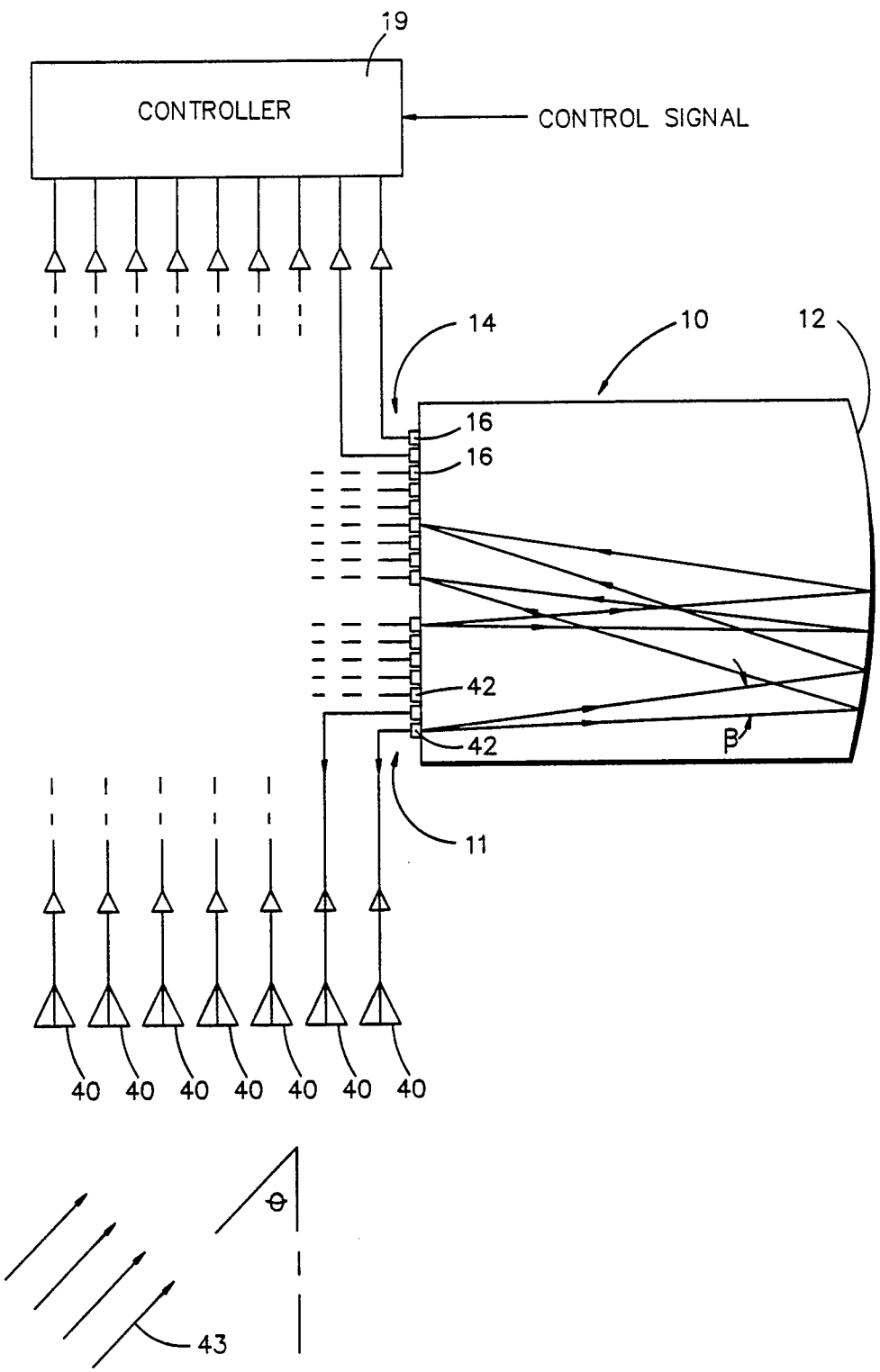
FIG. 6 is a schematic view of a bulk acoustic wave Fourier transformer, a plurality of antennas for receiving electromagnetic signals from a first set of transducers on said Fourier transformer and for transmitting such signals, a controller for delivering signals to the electrodes of selected ones of a second set of transducers mounted on said transformer.

As shown in FIG. 6, array of electrodes may also be used to establish the propagation angle for a transmitted signal from the antennas of the antenna array. The free-space beam steering of a planar array antenna is effectively modeled by matching the pattern of the antennas 40 and the array of electrodes or transducers 42 on the BAW body 10.

When the wave front of the incoming electromagnetic waves, represented by the arrows 43, is normal to the antenna array, the transducers 42 of the first transducer set 11 create acoustic waves that combine to focus, after reflection from surface 12, at the center of the output transducer array 16. When the wave front arrives at an angle to the antenna array, a linear phase shift or tilt occurs across the antenna array. Because the pattern of the array of the electrodes or transducers 42 is a replica of the pattern of the antennas 40 of the antenna array, a tilt of the phase shift across the antenna array is duplicated in the electrode and transducer array 11, and the acoustic beam in the BAW body is focussed off of the center of the output transducer array. The offset of the focusing position on the output transducer array is calibrated as a function of the phase tilt.

It can be shown that the ratio of the sine of the beam forming angle, $\beta$, in the bulk acoustic body 10 to the sine of the angle of arrival, $\theta$, of the electromagnetic waves 40, when the antennas are uniformly spaced and in a line, is equal to the ratio of the transducer spacing to the antenna spacing, where such spacing is measured in their respective wave lengths. That is, the wave length of the antenna pattern is the wave length of radio frequency waves in free space. The wave length of the transducer pattern is the wave length of the acoustic wave in the BAW body 10.

Figure 4:
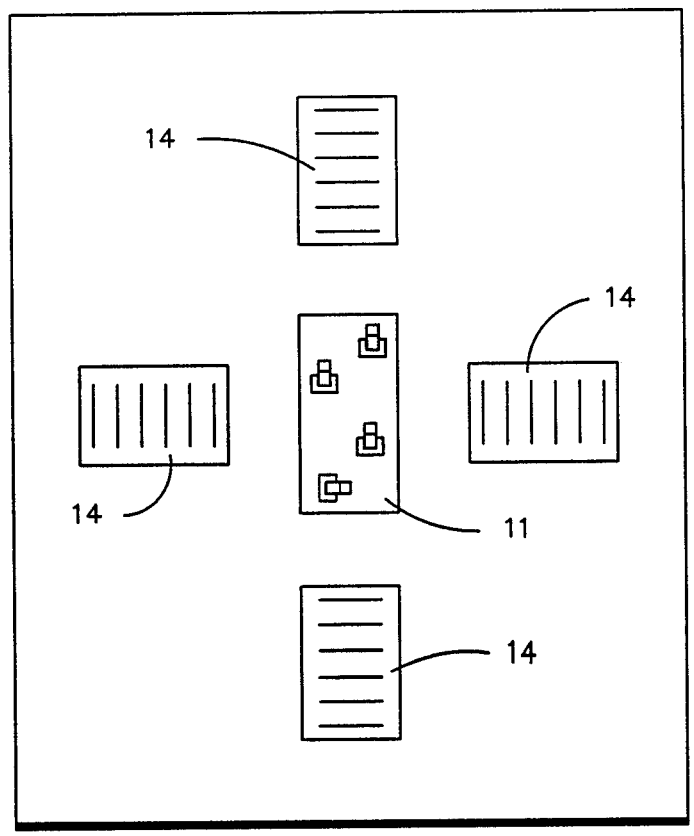
FIG. 4 is a view of the face of a two-dimensional sensor according to this invention.
Figure 5:
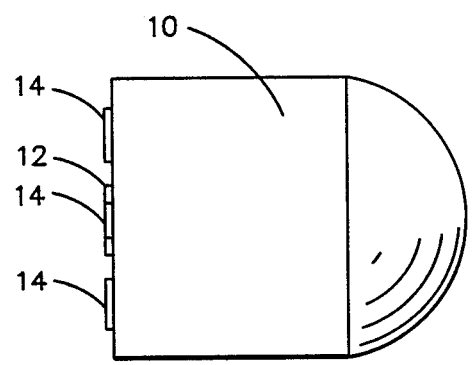
FIG. 5 is a side view of the apparatus of FIG. 4.

Because the acoustical apparatus is a two-dimensional Fourier transform apparatus, the angle of arrival can be obtained in two angular coordinates: azimuth and elevation. In FIGS. 4 and 5 is shown the positions of four output transducer sets that measure incoming angle in both azimuth and elevation.

The apparatus of FIG. 1 shows an apparatus that may be modified, for a second beam (not shown) is launched into the body 12 but is deflected through an angle, $\beta$, to the right rather than the left in FIG. 1. It is convenient to use two transducer arrays, 14, positioned with their alignment axes coaxial and the input array 11 between them as shown in FIG. 5. If desired, the two output transducer sets may be slightly staggered, preferably by the width of one-half of the center-to-center spacing of two adjacent transducers 16, so the assigned slots for the two transducer sets only partly overlap, and there are no gaps in angle detection caused by spaces between the transducers 16.

By placing four output transducer sets in the four quadrants, on two perpendicular coaxial alignment axes for the transducers 16, not only azimuth, but also elevation angles are measured.

As shown in FIG. 6, the processor can also be operated in the inverse mode as a controller 19 to deliver phase shifted signals to the antennas to generate an electromagnetic wave that propagates in a prescribed direction. The controller can choose which electrode 16, for a given angle control signal, should be energized. An electrical signal applied at the required carrier frequency to the electrode on a particular transducer 16 launches an acoustic beam from that transducer into the body 10. The launched beam is reflected by the surface 12 and delivered with the proper phase to the transducers of the set 11 which then energize their corresponding electrodes to energize the antennas 40 with the relative phases to propagate an electromagnetic signal in the direction desired.

When the antenna signals are fed to the input transducer sets 11 without frequency shifting, any frequency dependences of the stored acoustic beams are exactly compensated by the same frequency dependence at the antenna. The apparatus has a large fractional bandwidth without frequency related aberrations. For example, as the radio frequency goes up, the spacings between antennas are larger fractions of a wavelength of the new frequency. So, too, the spacings between transducers are larger fractions of a wavelength of the new frequency. The amount of increase, in terms of wavelength, is the same for the transducer spacings and the antenna spacings.

The apparatus operates in a multisignal environment, and it is capable of simultaneously sensing a plurality of incoming signals without crosstalk between the signals.

Similarly, because the processor is linear, multiple beams can simultaneously be generated and propagated in desired directions.

The apparatus has the advantage that the received signal angle of arrival is directly sensed without elaborate phase measuring methods and means, and the transmitted signal direction of propagation is directly controlled without elaborate phase generating methods and means.

Although the transducers and their electrodes have been shown in a planar array, it is not necessary that they be on a plane, for they can be on a curved surface.

It is especially important to note that the apparatus measures the angle of arrival, and produces the same angle of transmission at all frequencies.

Although the invention has been described in detail above, it is intended that the invention shall not be limited by that description, but by the description taken together with the accompanying claims.

I claim:

1. A bulk acoustic wave angle of arrival processor comprising:
   a plurality of receiving antennas positioned in a predetermined pattern;
   a bulk acoustic wave body having a -property of conducting bulk acoustic wave beams;
   said body having at least one inwardly concave acoustically reflecting and focusing surface defined thereon;
   a first transducer set, having electrodes equal in number to said antennas and having the same pattern as said antennas, each adapted to be connected to the one of said antennas having the same position in its pattern as the position of the transducer in its pattern, positioned upon one surface of said body to launch beams into said body toward said reflecting and focusing surface;

each said electrode having a transducer between it and said bulk acoustic wave body;

said acoustically reflecting surfaces including a portion of one concave inward surface which is positioned to receive acoustic beams launched from said input transducer set;

at least a second transducer set, each transducer of said second set having a plurality of juxtaposed, directed finger electrodes aligned in a row perpendicular to the long direction of said electrodes, positioned to receive steered beams from at least one of said reflecting surfaces; and the spacing among said electrodes being proportional, with the same constant of proportionality, to the corresponding spacing among antennas to which they are attached.

2. Apparatus as recited in claim 1 in which said electrodes have a spacing, expressed in fractions of the acoustical wavelength of acoustical beams within said body, that are the same as the spacing of the antennas to which they are connected, expressed in fractions of the electromagnetic free-space wavelength of waves of the same frequency as said acoustic waves.

3. Apparatus as recited in claim 2 in which said electrodes and antennas are in a line.

4. Apparatus as recited in claim 3 in which the spacing between said antennas and said electrodes in non-uniform.

5. Apparatus as recited in claim 4 in which the axis of alignment of said finger electrodes in said second transducer set is aligned with, and on said surface with, said first set of transducers.

6. Apparatus as recited in claim 5 in which the axes of alignment of said finger electrodes in each of said first and second sets is perpendicular to and on said surface with said second set of transducers.

7. Apparatus as recited in claim 4 in which said antennas and said electrodes are each in a straight line;

said additional transducer sets are second and third transducer sets, and the axes of alignment of said in each of said second and third transducer sets are colinear.

8. Apparatus as recited in claim 7 and further comprising;

fourth and fifth outputs transducer sets of said additional transducer sets, the axes of alignment of said finger electrodes in each of said fourth and fifth transducer sets being colinear and on said surface with said set of input transducers between them, the axes of alignment of said fourth and fifth transducer sets being perpendicular to the axes of alignment of said second and third transducer sets, whereby acoustical signals are launched by said energized finger transducer into said bulk acoustic wave body, said acoustical signals are reflected from said curved surface onto said first transducer set, said first transducer set generates voltage on its electrodes to deliver voltages of the proper frequency and phase to said antennas to propagate an electromagnetic signal in the controlled direction.

9. Apparatus as recited in claim 1 and further comprising means for creating control signals, connected to deliver such signals to at least one of said finger electrodes of said additional transducer sets;

whereby acoustical signals are launched by said energized finger transducer into said bulk acoustic wave body, said acoustical signals are reflected from said curved surface onto said first transducer set, said first transducer set generates voltages on its electrodes to deliver voltages of the proper frequency and phase to said antennas to propagate an electromagnetic signal in the controlled direction.

10. Means for steering a radio frequency signal, comprising:

a plurality of transmitting antennas having a predetermined position pattern.

a bulk acoustic wave body having a property of conducting bulk acoustic wave beams;

said body having at least one inwardly concave acoustically reflecting and focusing surface defined thereon;

a first transducer set, having electrodes equal in number to said antennas and having the same pattern as said antennas, each adapted to be connected to the one of said antennas having the same position in its pattern as the position of the transducer in its pattern, positioned upon one surface of said body to receive beams from said reflecting and focusing surface;

the spacing among said electrodes being proportional, with the same constant of proportionality, to the corresponding spacing among antennas to which they are attached;

each said electrode having a transducer between it and said bulk acoustic wave body;

at least a second transducer set, each transducer of said second set having a plurality of juxtaposed, directed finger electrodes aligned in a row perpendicular to the long direction of said electrodes, positioned to steer beams toward at least one of said reflecting surfaces;

said acoustically reflecting surfaces including a portion of one concave inward surface which is positioned to receive acoustic beams launched from said input transducer set.

11. Apparatus as recited in claim 10 in which said electrodes having a spacing, expressed in fractions of the acoustical wavelength of acoustical beams within said body, that are the same as the spacing of the antennas to which they are connected, expressed in fractions of the electromagnetic freespace wavelength of waves of the same frequency as said acoustic wave.

12. Apparatus as recited in claim 11 in which said electrodes and antennas are in a line.

13. Apparatus as recited in claim 12 in which the spacing between said antennas and said electrodes is non-uniform.

14. Apparatus as recited in claim 13 in which the axis of alignment of said finger electrodes in said second transducer set is aligned with, and on said surface with, said first set of transducers.

15. Apparatus as recited in claim 14 in which electrodes in each of said first and second sets are perpendicular to and on said surface with said second set of transducers.

16. Apparatus as recited in claim 10 in which said antennas and said electrodes are each in a straight line;

said additional transducer sets are second and third transducer sets, and the axes of alignment of said in each of said second and third transducer sets are colinear.

17. Apparatus as recited in claim 16 and further comprising;

fourth and fifth output transducer sets of said additional transducer sets, the axes of alignment of said finger electrodes in each of said fourth and fifth transducer sets being colinear and on said surface with said set of input transducers between them, the axes of alignment of said fourth and fifth transducer sets being perpendicular to the axes of alignment of said second and third transducer sets, whereby acoustical signals are launched by said energized finger transducer into said bulk acoustic wave body, said acoustical signals are reflected from said curved surface onto said first transducer set, said first transducer set generates voltage on its electrodes to deliver voltages of the proper frequency and phase to said antennas to propagate an electromagnetic signal in the controlled direction.

* * * * *